US012705346B2

(12) United States Patent
Zhang et al.

(10) Patent No.: US 12,705,346 B2
(45) Date of Patent: Aug. 11, 2026

(54) METHOD, DEVICE, AND STORAGE MEDIUM FOR DETECTING INTRUSION OF CONTAINER ENVIRONMENT

(71) Applicant: Beijing Volcano Engine Technology Co., Ltd., Beijing (CN)

(72) Inventors: Chen Zhang, Beijing (CN); Jianxin Guo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/106,588

(22) PCT Filed: Jun. 24, 2024

(86) PCT No.: PCT/CN2024/101086
§ 371 (c)(1),
(2) Date: Feb. 25, 2025

(87) PCT Pub. No.: WO2025/002069
PCT Pub. Date: Jan. 2, 2025

(65) Prior Publication Data

US 2026/0003959 A1 Jan. 1, 2026

(30) Foreign Application Priority Data

Jun. 30, 2023 (CN) ......................... 202310798807.3

(51) Int. Cl.
*G06F 21/55* (2013.01)
*G06F 9/455* (2018.01)
*G06F 18/243* (2023.01)

(52) U.S. Cl.
CPC ........ *G06F 21/554* (2013.01); *G06F 9/45558* (2013.01); *G06F 18/24323* (2023.01); *G06F 2009/45587* (2013.01)

(58) Field of Classification Search
CPC ............. G06F 21/554; G06F 18/24323; G06F 9/45558; G06F 2009/45587
See application file for complete search history.

(56) References Cited

U.S. PATENT DOCUMENTS 11,379,345 B2 * 7/2022 Weis ................... G06F 11/3644
2008/0320594 A1 * 12/2008 Jiang ..................... G06F 21/566 726/24

(Continued)

FOREIGN PATENT DOCUMENTS

CN 102546638 A 7/2012
CN 105072115 B 6/2018

(Continued)

OTHER PUBLICATIONS

"Web application attacks detection using machine learning techniques" G Betarte, Á Pardo, R Martínez—2018 17th IEEE International . . . , 2018—ieeexplore.ieee.org; 8 pages.*

(Continued)

*Primary Examiner* — Mohammad A Siddiqi
(74) *Attorney, Agent, or Firm* — Astute IP Law Group

(57) ABSTRACT

A method, a device and a storage medium for detecting intrusion of a container environment. The method includes: performing event recognition on a real-time system event by calling an event recognition model corresponding to the target container, where the event recognition model is constructed based on a historical normal system event of the target container; in response to determining that the real-time system event is an abnormal system event, calling a predetermined intrusion detection rule to perform intrusion detection on the real-time system event, to determine whether the real-time system event is an intrusion event. Thus, a real-time system event that belongs to a normal system event may be filtered out, and a complete intrusion detection may be performed on the abnormal system event, (Continued)

thereby reducing the amount of data for intrusion detection, reducing resource occupation, and improving the performance and efficiency of the intrusion detection.

17 Claims, 6 Drawing Sheets

(56) References Cited

U.S. PATENT DOCUMENTS

| | | | | |
|---|---|---|---|---|
| 2015/0248815 | A1* | 9/2015 | Pawloski | G07F 17/32 463/16 |
| 2018/0176244 | A1* | 6/2018 | Gervais | G06F 21/552 |
| 2018/0203934 | A1* | 7/2018 | Hampson | G06F 16/9535 |
| 2019/0081960 | A1 | 3/2019 | Kupfer et al. | |
| 2019/0163901 | A1 | 5/2019 | Tien et al. | |
| 2019/0197239 | A1* | 6/2019 | Govardhan | G06N 20/00 |
| 2019/0228154 | A1* | 7/2019 | Agrawal | G06N 3/09 |
| 2020/0042700 | A1* | 2/2020 | Li | G06F 21/554 |
| 2021/0112090 | A1 | 4/2021 | Rivera et al. | |
| 2022/0272093 | A1 | 8/2022 | Sims et al. | |
| 2023/0095966 | A1 | 3/2023 | Yang et al. | |
| 2023/0096108 | A1* | 3/2023 | Malanov | G06F 21/554 726/22 |

FOREIGN PATENT DOCUMENTS

| | | | |
|---|---|---|---|
| CN | 109495439 | A | 3/2019 |
| CN | 107689953 | B | 10/2020 |
| CN | 112905421 | A | 6/2021 |
| CN | 112989330 | A | 6/2021 |
| CN | 113051552 | A | 6/2021 |
| CN | 113726810 | A | 11/2021 |
| CN | 114117428 | A | 3/2022 |
| CN | 114168951 | A | 3/2022 |
| CN | 114205150 | A | 3/2022 |
| CN | 114254304 | A | 3/2022 |
| CN | 114257386 | A | 3/2022 |
| CN | 114326676 | A | 4/2022 |
| CN | 114666162 | A | 6/2022 |
| CN | 115484048 | A | 12/2022 |
| CN | 115496109 | A | 12/2022 |
| CN | 115514558 | A | 12/2022 |
| CN | 115766235 | A | 3/2023 |
| CN | 115834183 | A | 3/2023 |
| CN | 115906064 | A | 4/2023 |
| CN | 116015932 | A | 4/2023 |
| CN | 116167010 | A | 5/2023 |
| CN | 116821898 | A | 9/2023 |
| JP | 2019145107 | A | 8/2019 |
| JP | 2020529093 | A | 10/2020 |
| JP | 2021060987 | A | 4/2021 |
| WO | 2022195887 | A1 | 9/2022 |

OTHER PUBLICATIONS

Safety risk monitoring of cyber-physical power systems based on ensemble learning algorithm Qianmu Li, Shunmei Meng, Sainan Zhang , Ming Wu, Jing Zhang, 2019—ieeexplore.ieee.org; 18 pages.*
Gao et al., “Research on real-time early warning of network attack behavior based on the characteristics of alarm events”, Telecommunications Engineering Technology and Standardization, Dec. 15, 2018, 15 pages.
International Search Report and Written Opinion for PCT/CN2024/101086, mailed on Sep. 21, 2024, 13 pages.
Li et al., “Review of Intrusion Detection System”, Journal of Jilin University (Information Science Edition), vol. 34, No. 5, Sep. 15, 2016, 6 pages, with English Abstract.
Li et al., “Study of an Intrusion Event Correlation Method Based on Interactive Knowledge Discovery”, Journal of Computer Research and Development, vol. 41, No. 11, 2004, 8 pages, with English Abstract.
Liu et al., “Selective Ensemble of KELM-Based Complex Network Intrusion Detection”, Journal of Electronic Science, vol. 47, No. 5, May 2019, 9 pages, with English Abstract.
Notification of Granting Patent Right for Chinese Patent Application No. 202310798807.3, mailed on Jun. 10, 2024, 11 pages.
Office Action for Chinese Patent Application No. 202310798807.3, mailed on Apr. 3, 2024, 20 pages.
Shi, “Research on Hybrid Intrusion Detection System”, Energy Research and Information, vol. 19, Issue 1, Mar. 2003, 15 pages.
Sicilia et al., “Querying Streams of Alerts for Knowledge-Based Detection of Long-Lived Network Intrusions”, Lecture Notes In Artificial Intelligence, Dec. 2012, 12 pages.
Office Action for Japanese Patent Application No. 2025-510382, mailed on Oct. 7, 2025, 4 pages.

* cited by examiner

DEVICE FOR DETECTING INTRUSION OF CONTAINER ENVIRONMENT 600

603 FEATURE EXTRACTION UNIT

601 RECOGNIZING UNIT

602 INTRUSION DETECTING UNIT

METHOD, DEVICE, AND STORAGE MEDIUM FOR DETECTING INTRUSION OF CONTAINER ENVIRONMENT

CROSS REFERENCE TO RELATED APPLICATIONS

This application is a U.S. national stage application of International Patent Application No. PCT/CN2024/101086, filed on Jun. 24, 2024, which claims priority to Chinese Patent application Ser. No. 202310798807.3 filed on Jun. 30, 2023, entitled "METHOD, DEVICE, AND STORAGE MEDIUM FOR DETECTING INTRUSION OF CONTAINER ENVIRONMENT", the disclosures of which are incorporated herein by reference in their entireties.

FIELD

Embodiments of the present disclosure relate to the field of computer and network communication technologies, and in particular, to a method, a device, and a storage medium for detecting intrusion of container environment.

BACKGROUND

In a terminal type of security product, an intrusion detection capability is a key core technology, and is also very important for intrusion detection of a container environment, so that malicious network intrusion can be found and prevented in time, and the security of the container environment is ensured.

An existing intrusion detection method generally performs detection based on a detection rule set. However, with the increase of the detection rule set, the occupancy rate of a memory and a CPU in an intrusion detection process increases linearly, and the intrusion detection performance and efficiency are also reduced.

SUMMARY

Embodiments of the present disclosure provide a method, a device, and a storage medium for detecting intrusion of container environment, so as to improve intrusion detection performance and efficiency in the container environment.

According to a first aspect, embodiments of the present disclosure provide a method for detecting intrusion of container environment. The method includes: for a real-time system event of a target container, performing, by calling an event recognition model corresponding to the target container, event recognition on the real-time system event, where the event recognition model is constructed based on a historical normal system event of the target container and is configured to recognize whether the real-time system event in the target container belongs to a normal system event; and in response to determining that the real-time system event is an abnormal system event, calling a predetermined intrusion detection rule to perform intrusion detection on the real-time system event, and determining whether the real-time system event is an intrusion event.

According to a second aspect, an embodiment of the present disclosure provides a device for detecting intrusion of a container environment. The device includes: a recognizing unit configured to for a real-time system event of a target container, perform, by calling an event recognition model corresponding to the target container, event recognition on the real-time system event, where the event recognition model is constructed based on a historical normal system event of the target container and is configured to recognize whether the real-time system event in the target container belongs to a normal system event; and an intrusion detecting unit configured to in response to determining that the real-time system event is an abnormal system event, call a predetermined intrusion detection rule to perform intrusion detection on the real-time system event, and determine whether the real-time system event is an intrusion event.

According to a third aspect, an embodiment of the present disclosure provides an electronic device, including: at least one processor and a memory. The memory stores computer-executable instructions, and the at least one processor executes the computer-executable instructions stored in the memory, so as to execute the method for detecting intrusion of a container environment according to the first aspect and various possible designs of the first aspect.

According to a fourth aspect, an embodiment of the present disclosure provides a computer readable storage medium. The computer readable storage medium stores computer-executable instructions. When a processor executes the computer-executable instructions, the method for detecting intrusion of a container environment according to the first aspect and various possible designs of the first aspect is implemented.

According to a fifth aspect, an embodiment of the present disclosure provides a computer program product. The computer program product includes computer-executable instructions. When a processor executes the computer-executable instructions, the method for detecting intrusion of a container environment according to the first aspect and various possible designs of the first aspect is implemented.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, for those skilled in the art, other drawings may also be obtained according to these drawings without creative efforts.

DETAILED DESCRIPTION

Figure 1:
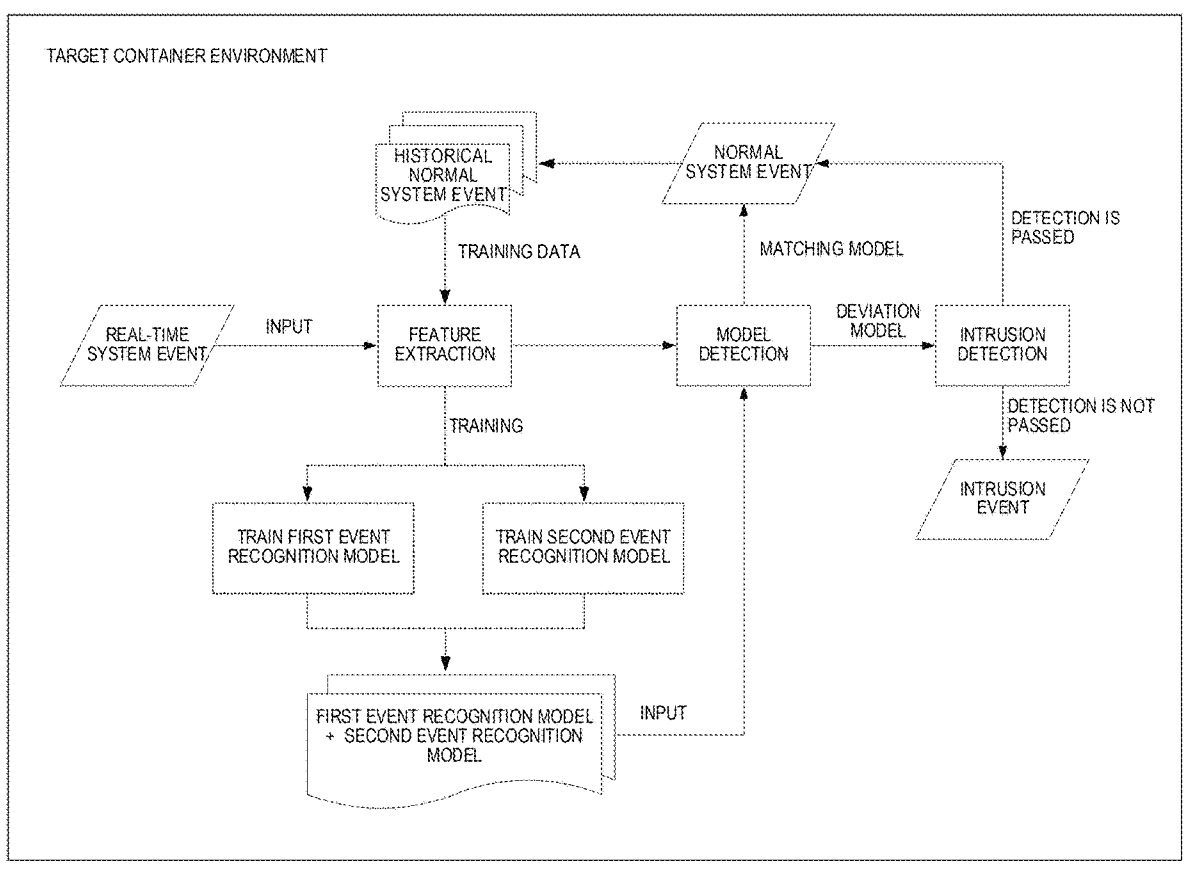
FIG. 1 is a schematic flowchart of a method for detecting intrusion of container environment according to an embodiment of the present disclosure.

In order to make objects, technical solutions and advantages of the embodiments of the present disclosure more apparent, the technical solutions in the embodiments of the present disclosure will be described below in a clearly and fully understandable way in connection with the drawings related to the embodiments of the present disclosure. Obviously, the described embodiments are only a part but not all of the embodiments of the present disclosure. Based on the embodiments of the present disclosure, all other embodiments obtained by persons of ordinary skill in the art without creative efforts shall belong to the scope of protection of the present disclosure.

First, the technical terms involved in the present disclosure are explained:

Container: a container is a kernel lightweight operating system layer virtualization technology, and can form an isolated operating system space for running a specific service;

System behavior event: a system behavior event collected by means of a security probe technology in a terminal security product, such as a process execution event, a file read/write event, a network connection event, etc.;

Intrusion detection: detecting whether an application service has an action of being attacked by a hacker during running;

ML algorithm: short for Machine Learning, machine learning algorithm;

Isolation forest algorithm: isolation forest is a fast outlier detection method, which has linear time complexity and high precision and is used for attack detection, financial transaction fraud detection, disease detection and noise data filtering in network security.

An existing intrusion detection method generally performs detection based on a detection rule set. However, with the increase of the detection rule set, the occupancy rate of a memory and a CPU in an intrusion detection process increases linearly, and the intrusion detection performance and efficiency are also reduced. Therefore, on the premise that the effect of the intrusion detection (the false alarm rate and the missed alarm rate) is guaranteed not to be lost, how to improve the performance and efficiency of the intrusion detection and reduce the resource usage dependence on the system is a very important index for measuring the capability of the intrusion detection engine.

In order to accelerate the intrusion detection and improve the detection efficiency, the following method can be adopted: 1. a small number of strong rule sets are used, and the intrusion detection is performed based on the strong rule sets; if there is no match, then it is directly determined as a normal event, and the execution based on full number of rules is not performed; the disadvantage of this method lies in that many mis-determination may be caused; 2. calculation performance of a detection engine is strengthened. The method is generally implemented by means of a hard encoding method or increasing a system resource quota of a detection engine, and a disadvantage lies in poor program expansibility and high resource occupation; 3. the number of collected events is reduced by processing the same by means of event compression. The disadvantage of the method lies in that data distortion may be caused, resulting in missing or erroneous alarms.

Therefore, the above method mainly improves and optimizes processes for the problem itself, but introduces some new problems at the same time, which does not solve the problem of calculation efficiency from the root. However, in practical applications, the probability of an intrusion event is relatively low, and the traffic proportion of normal events in a system is generally above 99.99%. If for all of these normal events, detection of a complete intrusion detection rule set needs to be executed, performance is lost, and a pressure on security operations may also be brought about due to a mis determination. Therefore, in the case of guaranteeing a security effect, the described problem is solved by means of a lightweight method, which is an efficient and secure solution concept.

In consideration of container load, since a container is generally a micro-service and bears only one service capability, the container has characteristics such as singularity, stability and being not easy to change. In the container in the running state, the processes, files and network behaviors thereof are relatively simple, and meanwhile, it has certain regularity. For example, in an Mysql container, when its system behavior is normal, a data file of a specific directory is generally read and written, and an open 3306 port is accessed by a specific application program IP; in an Nginx container, the system behavior thereof is accessing an 80 end or a 443 end by an external IP in normal circumstances, and performing proxy forwarding of network traffic, and generally, operations such as executing a system command and writing a file do not exist; in an authentication and certification service container, which is generally an API interface for accessing a database and a specific subsystem module, does not have an external IP, and does not perform operations such as system commands. Hence, in an application scenario of a container, compared with a service deployed by a virtual machine, a containerization service has a higher data purity of a system event generated by the container, which is a difference caused by the characteristics of singularity and stability of the container. According to the present disclosure, based on the characteristics of the singularity and stability of a container, it can be seen that the parameter length and feature information about a normal system event of the container have a certain regularity, and therefore an event recognition model corresponding to a target container can be constructed based on a historical normal system event of the target container. In addition, based on the event recognition model, it can be accurately recognized whether a real-time system event is a normal system event, and further, real-time system events belonging to the normal system events can be filtered out, and a complete intrusion detection is performed on real-time system events that are not filtered out, thereby reducing the amount of data of the intrusion detection, reducing resource occupation, improving the performance and efficiency of the intrusion detection, and realizing acceleration of the intrusion detection.

Specifically, as shown in FIG. 1, in the present disclosure, features of a real-time system event of a target container can be extracted to obtain target feature information, and then detection is performed based on an event recognition model; whether a parameter length of the real-time system event and the target feature information deviates from a normal system event are determined; and whether the real-time system event is a suspicious event is determined based on a determination result. If it is determined that the real-time system event is a normal system event, subsequent intrusion detection does not need to be performed; and if it is determined that the real-time system event is a suspicious event, a predetermined intrusion detection rule is called to perform intrusion detection on the real-time system event, so as to determine whether the real-time system event is an intrusion event.

Optionally, the event recognition model may include a first event recognition model and a second event recognition model, the first event recognition model is constructed based on a parameter length of a historical normal system event of a target container; the second event recognition model is constructed based on feature information of a historical normal system event of the target container, and therefore, the first event recognition model and the second event recognition model may be used respectively to determine whether the parameter length of the real-time system event and the target feature information deviates from the normal system event. Further, a real-time system event filtered out by means of a model detection process as belonging to a normal system event, and a real-time system event determined by means of an intrusion detection process as a non-intrusion event can be added to the historical normal system events, and iterative training is performed on a first event recognition model and a second event recognition model, so that the model is self-adaptive, and the robustness of the system is improved.

The following describes in detail a method for detecting intrusion of container environment according to the present disclosure with reference to specific embodiments.

Figure 2:
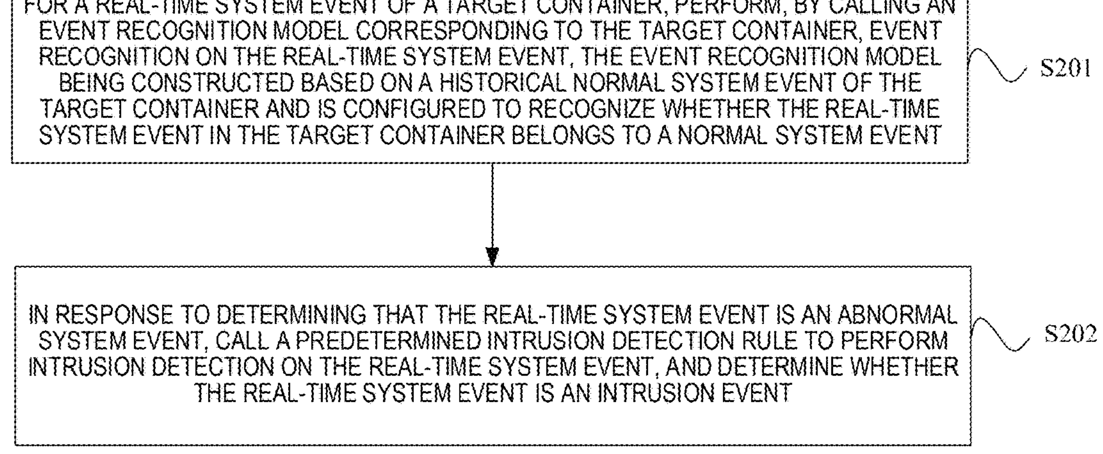
FIG. 2 is a schematic flowchart of a method for detecting intrusion of container environment according to another embodiment of the present disclosure.

Referring to FIG. 2, FIG. 2 is a schematic flowchart of a method for detecting intrusion of a container environment according to an embodiment of the present disclosure. The method in this embodiment may be applied to a terminal device or a server. The method for detecting intrusion of a container environment includes the followings.

At block S201, for a real-time system event of a target container, an event recognition model corresponding to the target container is called to perform event recognition on the real-time system event, the event recognition model is constructed based on historical normal system events of the target container and is used to recognize whether the real-time system event of the target container belongs to a normal system event.

In this embodiment, by using the characteristics of the container's singularity and stability, the normal system event of the target container has a certain regularity, and therefore an event recognition model can be constructed in advance according to the historical normal system event of the target container. The event recognition model may be used to recognize whether any system event of the target container belongs to a normal system event. In this embodiment, the normal system event matching model and the event recognition model are also not limited, for example, any machine learning model capable of implementing the foregoing functions may be used.

However, in an actual application, a real-time system event of a target container may be acquired in real time, an event recognition model corresponding to the target container is called to perform event recognition on the real-time system event, and it is determined whether the real-time system event is a normal system event.

At block S202, if it is determined that the real-time system event is an abnormal system event, a predetermined intrusion detection rule is called to perform intrusion detection on the real-time system event, so as to determine whether the real-time system event is an intrusion event.

In this embodiment, after event recognition is performed on a real-time system event by using an event recognition model, if it is determined that the real-time system event is a normal system event, no intrusion detection is performed on the real-time system event by calling a predetermined intrusion detection rule, thereby filtering out the real-time system event; if it cannot be determined that the real-time system event is a normal system event, the real-time system event is a suspicious event, and a predetermined intrusion detection rule is called to perform intrusion detection on the real-time system event, thereby more accurately determining whether the real-time system event is an intrusion event. By filtering out normal system events, resource occupation is reduced, the performance and efficiency of intrusion detection are improved, and acceleration of intrusion detection is realized. Generally, because a probability that an intrusion event occurs is relatively low, 99.99% normal system events may be filtered out from the real-time system events through the foregoing process. In this way, only the remaining 0.01% of suspicious events may be subjected to full-amount intrusion detection according to predetermined intrusion detection rules, thus, the problem of detection efficiency is solved from the data source, and the intrusion detection is accelerated.

Further, if it is determined that the real-time system event is an intrusion event, an alarm may be generated.

According to the method for detecting intrusion of a container environment according to this embodiment, for a real-time system event of a target container, an event recognition model corresponding to the target container is called to perform event recognition on the real-time system event, where the event recognition model is constructed based on a historical normal system event of the target container and is used for recognizing whether the real-time system event of the target container belongs to a normal system event; if it is determined that the real-time system event is an abnormal system event, a predetermined intrusion detection rule is called to perform intrusion detection on the real-time system event, and whether the real-time system event is an intrusion event is determined. In the embodiments of the present disclosure, by utilizing the characteristics of the container, such as singularity and stability, an event recognition model corresponding to the target container is constructed based on a historical normal system event of the target container, then, based on the event recognition model, it may be accurately recognized whether the real-time system event is a normal system event, and then, a real-time system event that belongs to a normal system event may be filtered out, and a complete intrusion detection may be performed on a real-time system event that is not filtered out, thereby reducing the amount of data of intrusion detection, reducing resource occupation, improving the performance and efficiency of the intrusion detection, and realizing acceleration of intrusion detection.

Figure 3:
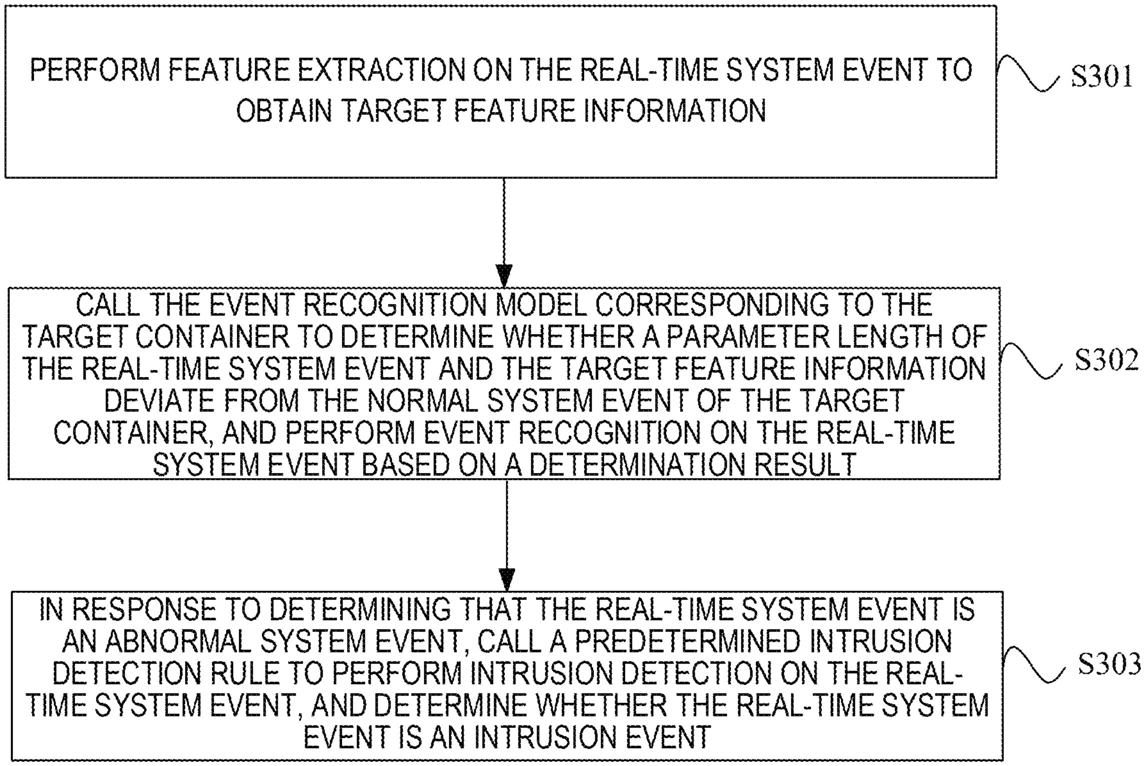
FIG. 3 is a schematic flowchart of a method for detecting intrusion of container environment according to another embodiment of the present disclosure.

Referring to FIG. 3, FIG. 3 is a schematic flowchart of a method for detecting intrusion of container environment according to an embodiment of the present disclosure. Based on the foregoing embodiments, the method for detecting intrusion of a container environment includes the followings.

At block S301, feature extraction is performed on a real-time system event of a target container to obtain target feature information.

In this embodiment, a plurality of different types of system events may be collected in a target container, including but not limited to a process execution event, a file read/write event, a network access event, and a system capability calling event. Under normal circumstances, for a single container, these events may present singularity and periodicity on a time axis. Any type of system event is collected in real time, which may be used as a real-time system event in this embodiment.

Optionally, in practical applications, the process execution event is the most important system event, and other events such as a file read/write event and a network access event are all triggered by the process execution event, so generally, if a process execution event has been determined to be a normal system event, other system call events triggered by the process execution event, such as, a file read/write event, a network access event, and the like, are probably normal system events as well. Therefore, in this embodiment, the real-time system event is preferably a process execution event, and of course, another system event may also be selected.

Data of a real-time system event may be collected during running of a target container, and specifically, may be collected by using a security probe technology on a server. For example, data of a process execution event mainly includes:

Process name: such as curl

Process bin (binary): such as/bin/curl parent process name: such as java parent process bin: such as/bin/java command line cmdline: such as curl http://aaaa. bbb. ccc Process parameters: such as http://dddd. eee. fff Further, features of a real-time system event may be extracted to obtain target feature information, where the target feature information may be attribute information of the real-time system event, for example, for a process execution event, the target feature information may include but is not limited to attribute information such as a process name, a parent process name, a standard input type, a standard output type, a parameter type, and a parameter format included in data.

Optionally, according to characteristics of the attribute information, attribute information included in the data of the real-time system event may be classified into two types, first type of attribute information and second type of attribute information.

The first type of attribute information is a strong feature attribute and is attribute information having a fixed amount of information and a fixed pattern, for example, a process name, a process bin, a parent process name, a parent process bin, a standard input type, a standard output type, etc., and such a strong feature attribute is a feature with high confidence, each type of attribute information has one or more candidate items, that is, the amount of information is fixed, and the pattern is fixed (for example, the format is fixed, the type is fixed, and the quantity is fixed), and inconsistency condition is not allowed to occur. Once a case of inconsistency occurs, it represents an abnormal process execution event, for example, the attribute information, such as a process name, has several fixed candidate process names, each candidate process name represents one type of process, and the process names of the same type of processes are fixed, i.e., in a fixed pattern. Therefore, for the attribute information such as process name, the amount of information and pattern are fixed, and if the process name of a certain process execution event is not consistent with any candidate process name, the process execution event is an abnormal process execution event. The second type of attribute information is a weak feature attribute, the confidence degree of the second type of attribute information is lower than that of the first type of attribute information, and the second type of attribute information contains a large amount of information, and the amount of information may not be fixed, the pattern may also not be fixed, and the feature can only be extracted by means of data conversion, for example, the process parameters of different commands are different in type, format and number, and the process parameters of the same command are different. Hence, data conversion (or referred to as generalization) needs to be performed on the second type of attribute information to derive a stable feature dimension.

The conversion of the second type of attribute information can also be realized by means of feature extraction, in which the extracted features may include, but are not limited to, the following dimensions:

a) whether it is a digital type b) whether it is a word type c) whether it is a script type d) whether there is a URL (Uniform Resource Locator)

e) whether there is an IP address f) whether there is a UUID (Universally Unique Identifier)

g) whether it is of other type

Feature recognition of the dimension data may be obtained by parsing a common algorithm or a regular expression, and details are not described herein again.

Figure 4:
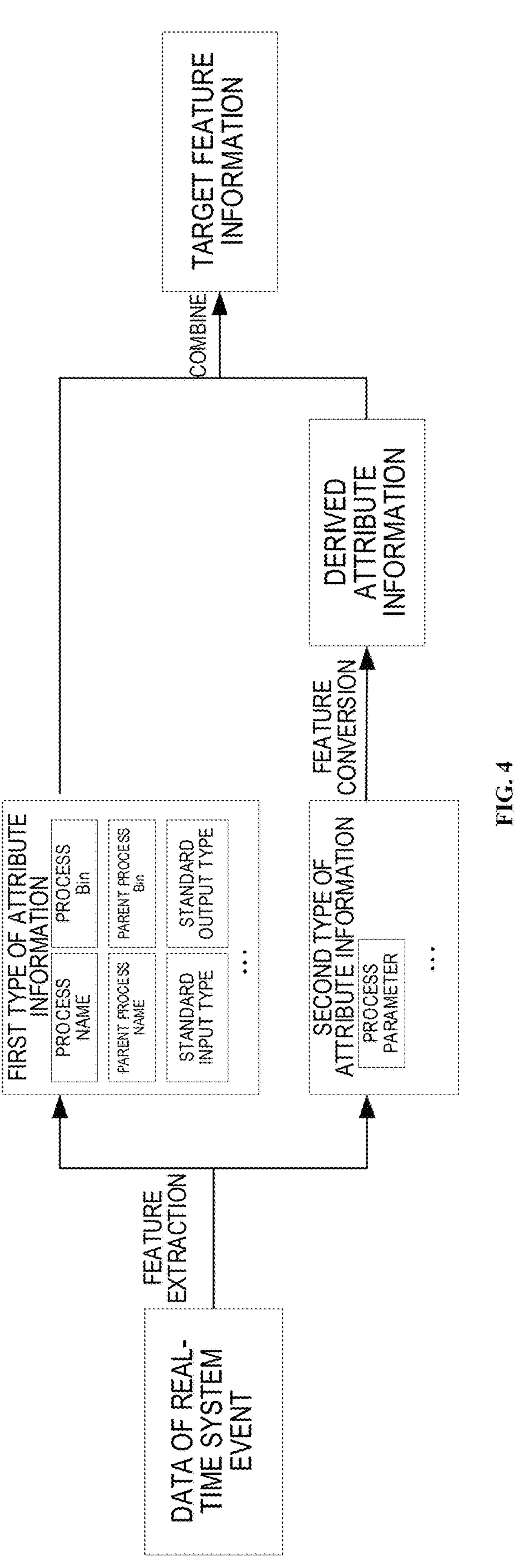
FIG. 4 is a schematic flowchart of a feature extraction process according to another embodiment of the present disclosure.

Therefore, as shown in FIG. 4, in this embodiment, the first type of attribute information and the second type of attribute information in the data of the real-time system event may be acquired, the second type of attribute information is converted to obtain derived attribute information, and then the first type of attribute information and the derived attribute information are combined to obtain the target feature information.

For example, the target characteristic information of the process execution event is as follows:

| Process name | Process bin | Parent process name | Parent process bin | Standard input | Standard input | Numerical type | Word type | Script type | URL | . . . |
|---|---|---|---|---|---|---|---|---|---|---|
| curl | /bin/curl | java | /bin/java | 1 | 1 | 0 | 1 | 1 | 0 | . . . |

At block S302, the event recognition model corresponding to the target container is called, whether a parameter length of the real-time system event and the target feature information deviates from a normal system event of the target container is determined, and event recognition on the real-time system event is performed based on a determination result.

In this embodiment, an event recognition model is constructed in advance based on a historical normal system event of a target container, and parameter length information and target feature information about the normal system event of the target container can be learned and summarized in the event recognition model. The event recognition model may be any machine learning model or other model capable of achieving the learning objectives described above.

In addition, with regard to any real-time system event, based on target feature information about the real-time system event, whether a parameter length of the real-time system event and the target feature information deviates from a normal system event can be determined by means of an event recognition model, if the deviation occurs, the real-time system event is determined as a suspicious event, and if the deviation does not occur, the real-time system event is determined as a normal system event. By utilizing the characteristics of monotonicity and stability of a container, and by combining a parameter length and target feature information, mis determination and false determination may be reduced. In this embodiment, how to learn and summarize parameter length information and target feature information about a normal system event in an event recognition model is not limited; in this embodiment, a model used by the event recognition model is also not limited, and the foregoing functions may be implemented by using one model or by using two or more models.

At block S303, if it is determined that the real-time system event is an abnormal system event, a predetermined intrusion detection rule is called to perform intrusion detection on the real-time system event, so as to determine whether the real-time system event is an intrusion event.

Similar to the above step S202, it will not be repeated here.

In this embodiment, by utilizing the characteristics of the container, such as monotonicity and stability, whether a real-time system event deviates from a normal system event is determined from two aspects, i.e., a parameter length and target feature information of the real-time system event. In this way, a real-time system event that does not deviate from a normal system event is filtered out with high accuracy, and a complete intrusion detection is performed on the real-time system event that deviates from the normal system event, thereby reducing the amount of data of intrusion detection, reducing resource occupation, and improving the performance and efficiency of the intrusion detection, realizing acceleration of intrusion detection.

On the basis of any of the described embodiments, in order to improve the effectiveness of a model and reduce a false determination rate and a mis determination rate, an event recognition model is realized by using a dual-engine model including a first event recognition model and a second event recognition model; the first event recognition model is constructed based on a parameter length of a historical normal system event of the target container, and is configured for determining whether the parameter length of the real-time system event does not meet the parameter length of the normal system event, the second event recognition model is constructed based on feature information about a historical normal system event of the target container, and is configured for determining whether the target feature information of the real-time system event deviates from the feature information of the normal system event.

Figure 5:
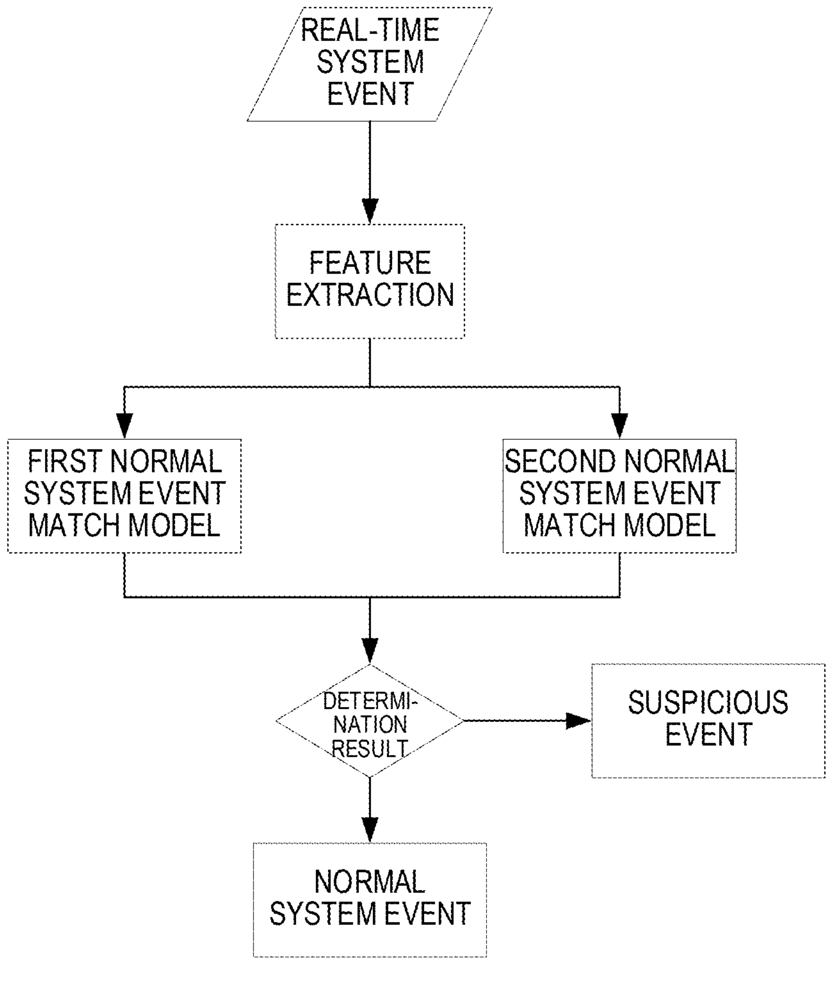
FIG. 5 is a schematic flowchart of a method for detecting intrusion of container environment according to another embodiment of the present disclosure.

Therefore, an overall flow of the method for detecting intrusion of a container environment according to this embodiment is shown in FIG. 5. After the determination by the first event recognition model and the second event recognition model are performed, when the first event recognition model determines that the parameter length of the real-time system event satisfies the parameter length of the normal system event, and the second event recognition model determines that the target feature information of the real-time system event does not deviate from the feature information about the normal system event, it is determined that the real-time system event is a normal system event. When the first event recognition model determines that the parameter length of the real-time system event does not satisfy the parameter length of the normal system event, and/or the second event recognition model determines that the target feature information of the real-time system event deviates from the feature information of the normal system event, it is determined that the real-time system event is an abnormal system event, and it is determined that the real-time system event is a suspicious event.

Further, when calling the event recognition model corresponding to the target container to determine whether a parameter length of the real-time system event and the target feature information deviate from a normal system event of the target container and performing event recognition on the real-time system event based on a determination result, the method may include:

- inputting the target feature information and the parameter length of the real-time system event into the first event recognition model, and determining whether the parameter length of the real-time system event does not meet the parameter length of the normal system event; and
- inputting the target feature information into the second event recognition model, and determining whether the target feature information deviates from feature information of the normal system event.

More specifically, the first event recognition model can pre-learn and summarize a parameter length rule of historical normal system events to obtain a predetermined mapping relationship, and the predetermined mapping relationship is a mapping between a keyword corresponding to a normal system event and corresponding parameter length information, and can be stored using a Key-Value. The Key is a key constructed according to feature information of a historical normal system event, and the Value is parameter length information of the historical normal system event. For example, feature information of a certain historical normal system event is as follows:

| Process name | Process bin | Parent process name | Parent process bin | Standard input | Standard input | Numerical type | Word type | Script type | URL | . . . |
|---|---|---|---|---|---|---|---|---|---|---|
| curl | /bin/curl | java | /bin/java | 1 | 1 | 0 | 1 | 1 | 0 | . . . |

A keyword Key is constructed according to feature information about the historical normal system event, for example, each dimension of the feature information is superposed and combined to obtain: curl+/bin/curl+/java+/bin/java&1&1&1&0, and Value us an average value and a standard deviation, or a minimum value and a maximum value, etc. of parameter lengths of historical normal system events of the same Key. Taking the average value and the standard deviation as an example, the predetermined mapping relationship can be as follows:

| Key | Value |
|---|---|
| curl&/bin/curl&java&/bin/java&1&1&0&1&1&0 | 20.3 |
| nc&/bin/nc&bash&/bin/bash&0&0&0&1&1&0 | 15.2 |
| . . . | . . . |

For a real-time system event, a target keyword may be constructed according to target feature information thereof, and is searched in a predetermined mapping relationship, and if a keyword identical to the target keyword is found in the predetermined mapping relationship, parameter length information about a normal system event corresponding to the keyword is acquired. Then, it is determined whether the parameter length X of the real-time system event does not meet the parameter length of the normal system event according to the parameter length X of the real-time system event and the parameter length information of the normal system event corresponding to the keyword. For example, if the parameter length information of the normal system event is a mean value u and a standard deviation σ, it may be calculated whether the parameter length X of the real-time system event satisfies the threshold setting of the confidence. Based on the Chebyshev inequality theorem, the threshold calculation of confidence can be simplified to: $y=u\pm N^*\sigma$ (u is mean, σ is standard deviation, N is tolerance). That is, a range from the mean u minus $N^*\sigma$ to the mean u plus $N^*\sigma$ is the threshold interval, and if the parameter length X of the real-time system event is within the threshold interval, it is considered that the real-time system event matches the first event recognition model, that is, the parameter length of the real-time system event satisfies the parameter length of the normal system event, otherwise, it is determined that the real-time system event deviates from the first event recognition model, that is, the parameter length of the real-time system event does not meet the parameter length of the normal system event.

If the parameter length information of the normal system event is a maximum value and a minimum value, the threshold interval is directly determined according to the maximum value and the minimum value. If the parameter length X of the real-time system event is within the threshold interval, it is considered that the real-time system event matches the first event recognition model, that is, the parameter length of the real-time system event satisfies the parameter length of the normal system event. Otherwise, it is determined that the real-time system event deviates from the first event recognition model, that is, the parameter length of the real-time system event does not meet the parameter length of the normal system event.

In addition, if no keyword that is identical to the target keyword is retrieved in the predetermined mapping relationship, it is determined that the real-time system event deviates from the first event recognition model. In particular, the target keyword of the real-time system event deviates from a keyword of a normal system event, which also indicates that target feature information of the real-time system event deviates from feature information of the normal system event.

On the basis of any of the foregoing embodiments, the second event recognition model is configured to determine whether target feature information of a real-time system event deviates from feature information of a normal system event, therefore, the second event recognition model may be an outlier determination model, and the target feature information may be input into the second event recognition model to determine whether the target feature information is an outlier with respect to the feature information corresponding to the normal system event. If it is determined that the target feature information is an outlier, it is determined that the target feature information is feature information that deviates from a normal system event.

Alternatively, the outlier point determination model used by the second event recognition model may be an isolation forest model. The isolation forest model uses a binary tree to segment data, and the depth of a data point in the binary tree reflects the degree of "evacuation" of the piece of data, where the shallower the depth is, the more likely the outlier point is. In this embodiment, the second event recognition model includes a binary tree structure formed by constructing a feature matrix of a normal system event. Then, a matrix may be constructed according to target feature information of a real-time system event to obtain a target feature matrix, the target feature matrix is matched with the isolation forest model to determine the depth of the target feature matrix in the binary tree, in this way, it is determined whether the target feature matrix is an outlier. When a matrix is constructed according to target feature information of a real-time system event, non-numerical feature information in the target feature information may be converted into feature information of a numerical type, for example, by using a Label Encoder or one-hot algorithm, which is not limited herein.

On the basis of any of the foregoing embodiments, the first event recognition model may be obtained through the following process:

At block S401, a plurality of historical normal system events of the target container is obtained.

At block S402, feature extraction is performed on each of the plurality of historical normal system events to obtain historical feature information corresponding to each of the historical normal system events.

At S403, parameter length information of a normal system event is obtained based on historical feature information corresponding to the plurality of historical normal system events and a plurality of parameters of the historical normal system events, so as to obtain the first event recognition model.

In this embodiment, a plurality of historical normal system events of the target container may be collected, for example, normal system events that occur within a period of time (for example, 1 day or 2 days) in the past, separately performing feature extraction processes on a plurality of historical normal system events is the same as the foregoing S201, and then, based on historical feature information corresponding to the plurality of historical normal system events and parameters of the plurality of historical normal system events, parameter length information about a normal system event is learned, and a first event recognition model is constructed.

Specifically, because the parameter length information of the normal system event in the first event recognition model includes the predetermined mapping relationship, The predetermined mapping relationship is a mapping between the keyword corresponding to the normal system event and the corresponding parameter length information, therefore, the predetermined mapping relationship may be established based on historical feature information corresponding to the plurality of historical normal system events and parameters of the plurality of historical normal system events, and the process is as follows.

A corresponding keyword is constructed according to historical feature information corresponding to each historical normal system event. For a process of constructing a keyword, reference may be made to the foregoing embodiments.

A plurality of historical normal system events is grouped based on a keyword to obtain a plurality of groups, and historical normal system events in each group have the same keyword. Further, a parameter of each historical normal system event of the same keyword is acquired, and corresponding parameter length information is acquired according to the parameters of the historical normal system events of the same keyword, for example, an average value and a standard deviation, or a minimum value and a maximum value of parameter lengths of historical normal system events of the same keyword. Then, a mapping relationship between each keyword and the corresponding parameter length information is constructed to obtain a predetermined mapping relationship and parameter length information of a normal system event may be stored using Key-Value, in which the Key is a keyword, and the Value is the corresponding parameter length information.

On the basis of any of the foregoing embodiments, the foregoing second event recognition model may be obtained through the following process:

At block S501, a plurality of historical normal system events of the target container is acquired.

At block S502, feature extraction is performed on each historical normal system event to obtain historical feature information corresponding to each historical normal system event.

At block S503, unsupervised learning is performed on historical feature information corresponding to the plurality of historical normal system events to obtain the second event recognition model.

Figures 6, 7:
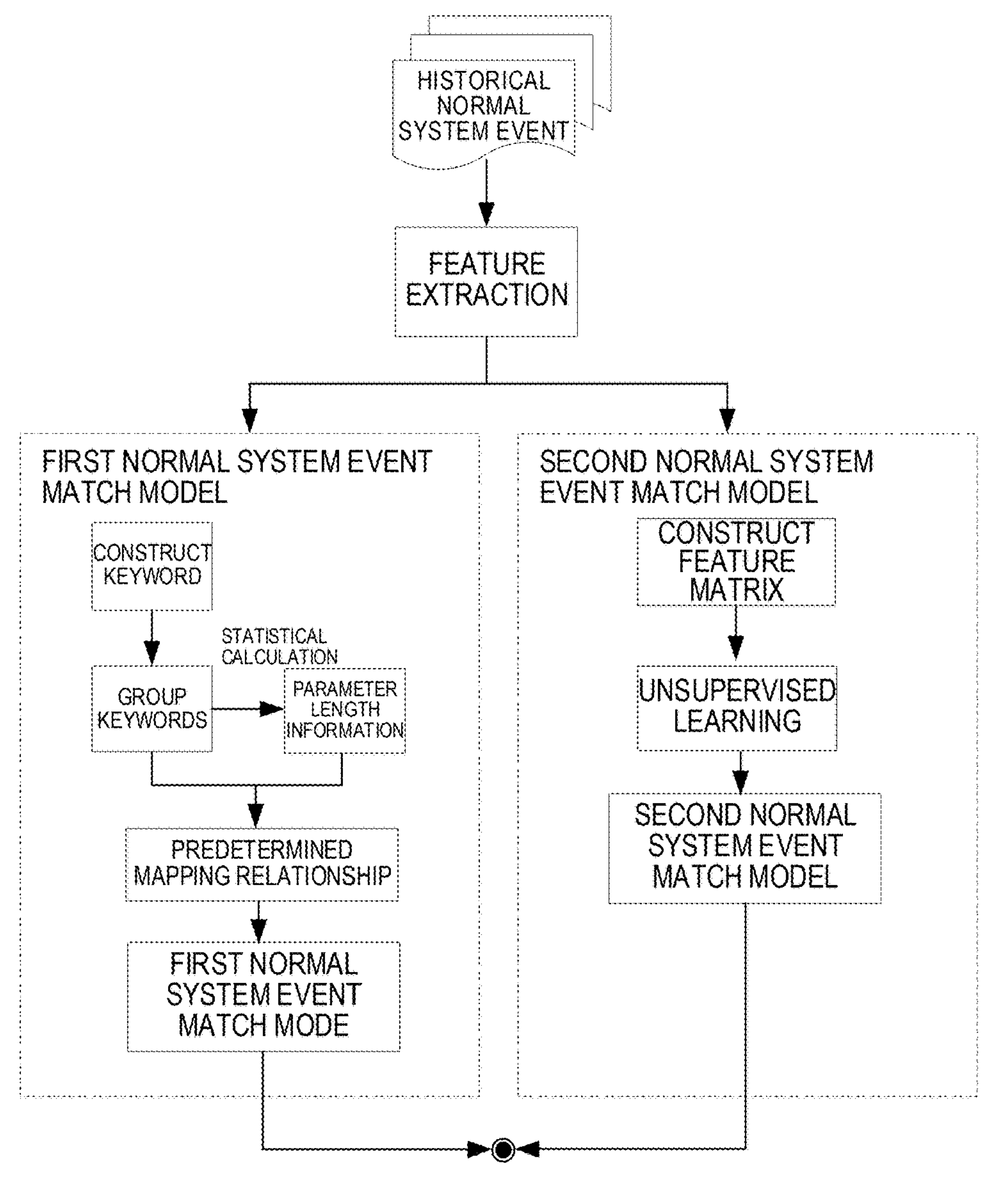
FIG. 6 is a schematic flowchart of a training procedure according to another embodiment of the present disclosure.
FIG. 7 is a structural block diagram of an intrusion detection apparatus for a container environment according to an embodiment of the present disclosure.

In this embodiment, the plurality of historical normal system events may be the same as the historical normal system events in S401, of course, they may also be different historical normal system events. For a plurality of historical normal system events, the feature extraction processes are the same as the foregoing S301. If a plurality of historical normal system events is the same as the historical normal system events in S401, the process of acquiring a plurality of historical normal system events of the target container and performing feature extraction on each of the historical normal system events do not need to be performed again, as shown in FIG. 6.

After obtaining the historical feature information corresponding to the plurality of historical normal system events, unsupervised learning may be performed based on the historical feature information corresponding to the plurality of historical normal system events to obtain the second event recognition model. A specific learning process may be differentiated by adopting different outlier determining models according to the second event recognition model, which is not limited herein.

If the second event recognition model is an isolation forest model, the specific process of unsupervised learning includes:

constructing a matrix for historical feature information corresponding to each of the historical normal system events, so as to obtain a feature matrix of each of the historical normal system events; and when constructing the matrix, feature information of non-numerical type in the historical feature information may be converted into feature information of a numerical type by using, for example, a Label Encoder, one-hot algorithm, etc., which is not limited herein. In addition, unsupervised learning of the isolation forest model may be performed according to the characteristic matrix of the plurality of historical normal system events. The specific learning process of the isolation forest model is not repeated here.

The first event recognition model and the second event recognition model in the foregoing embodiment are obtained by training using a plurality of historical normal system events of the target container, which utilizes the characteristics of the container's singularity and stability. The two models are also models unique to the target container. The two models are used to detect a real-time system event of a target container, thereby effectively improving the accuracy of normal system event filtering, While the detection efficiency is improved, the risk of mis determination and false determination is reduced.

On the basis of any of the foregoing embodiments, the real-time system events that belong to the normal system events and are filtered in steps S201 and S302, and the real-time system events that are determined as non-intrusive events in step S303 may be added to the historical normal system events, and iterative training is performed on the first event recognition model and the second event recognition model, so that the model is self-adaptive, and the robustness of the system is improved.

Corresponding to the method for detecting intrusion of a container environment according to the foregoing embodiments, FIG. 7 is a structural block diagram of an intrusion detection apparatus for a container environment according to an embodiment of the present disclosure. For ease of description, only parts related to the embodiments of the present disclosure are shown. Referring to FIG. 7, the device 600 for detecting intrusion of a container environment includes: a recognizing unit 601 and an intrusion detecting unit 602.

The recognizing unit 601 is configured to for a real-time system event of a target container, perform, by calling an event recognition model corresponding to the target container, event recognition on the real-time system event. The event recognition model is constructed based on a historical normal system event of the target container and is configured to recognize whether the real-time system event in the target container belongs to a normal system event.

The intrusion detecting unit 602 is configured to in response to determining that the real-time system event is an abnormal system event, call a predetermined intrusion detection rule to perform intrusion detection on the real-time system event, and determine whether the real-time system event is an intrusion event.

In one or more embodiments of the present disclosure, the device 600 further includes a feature extraction 603 configured to perform feature extraction on the real-time system event to obtain target feature information.

The recognizing unit 601 is further configured to call the event recognition model corresponding to the target container to determine whether a parameter length of the real-time system event and the target feature information deviate from a normal system event of the target container, and perform event recognition on the real-time system event based on a determination result.

In one or more embodiments of the present disclosure, the event recognition model includes a first event recognition model and a second event recognition model; where the first event recognition model is constructed based on a parameter length of a historical normal system event of the target container; the second event recognition model is constructed according to feature information of a historical normal system event of the target container.

In one or more embodiments of the present disclosure, when calling the event recognition model corresponding to the target container to determine whether the parameter length of the real-time system event and the target feature information deviate from the normal system event of the target container, and performing event recognition on the real-time system event based on the determination result, the recognizing unit 601 is configured to:

input the target feature information and the parameter length of the real-time system event into the first event recognition model, and determine whether the parameter length of the real-time system event does not meet a parameter length of the normal system event; and input the target feature information into the second event recognition model, and determine whether the target feature information deviates from feature information of a normal system event.

In one or more embodiments of the present disclosure, the first event recognition model is configured with a predetermined mapping relationship, and the predetermined mapping relationship is a mapping between a keyword corresponding to the normal system event of the target container and corresponding parameter length information, and the keyword corresponding to the normal system event is constructed from the feature information of the normal system event.

When inputting the target feature information of the real-time system event and the parameter length are input into the first event recognition model and determining whether the parameter length of the real-time system event does not meet the parameter length of the normal system event, the recognizing unit 601 is configured to:

construct a target keyword based on the target feature information;

retrieve a predetermined mapping relationship based on the target keyword;

in response to retrieving a keyword that is identical to the target keyword in the predetermined mapping relationship, acquire parameter length information of a normal system event corresponding to the keyword;

determine whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determine that the target feature information deviates from the normal system event.

In one or more embodiments of the present disclosure, the second event recognition model is an outlier determination model. Correspondingly, when inputting the target feature information into the second event recognition model and determining whether the target feature information deviates from feature information of a normal system event, the recognizing unit 601 is configured to:

input the target feature information into the second event recognition model, and determining whether the target feature information is an outlier relative to the feature information corresponding to the normal system event; and If it is determined that the target feature information is an outlier, determine that the target feature information is feature information that deviates from a normal system event.

In one or more embodiments of the present disclosure, the second event recognition model is an isolation forest model constructed on the basis of a historical normal system event. Correspondingly, when inputting the target feature information into the second event recognition model and determining whether the target feature information is an outlier relative to feature information corresponding to the historical normal system event, the recognizing unit 601 is configured to:

construct a matrix based on the target feature information to obtain a target feature matrix; and match the target feature matrix and the isolation forest model to determine whether the target feature matrix is an outlier.

In one or more embodiments of the present disclosure, when performing feature extraction on the real-time system event of the target container to obtain the target feature information, the feature extraction 603 601 is configured to:

acquire first type of attribute information and second type of attribute information from data of the real-time system event; where the first type of attribute information is attribute information having a fixed amount of information and a fixed pattern, and the second type of attribute information is attribute information having an unfixed amount of information or pattern;

convert the second type of attribute information to obtain derived attribute information; and combine the first type of attribute information and the derived attribute information to obtain the target feature information.

In one or more embodiments of the present disclosure, the device further includes a training unit, configured to perform a training process on the first event recognition model, where the training process is as follows:

acquiring a plurality of historical normal system events of the target container;

performing feature extraction on a plurality of the historical normal system events respectively to obtain historical feature information corresponding to each of the historical normal system events.

acquiring, based on historical feature information corresponding to the plurality of historical normal system events and parameters of a plurality of the historical normal system events, parameter length information of the normal system event to obtain the first event recognition model.

In one or more embodiments of the present disclosure, when acquiring, based on the historical feature information corresponding to the plurality of historical normal system events and the parameters of the plurality of historical normal system events, the parameter length information of the normal system event to obtain the first event recognition model, the training unit is configured to:

construct a corresponding keyword according to historical feature information corresponding to each of the historical normal system events;

group a plurality of historical normal system events based on the keyword to acquire parameters of the historical normal system events with the same keyword, and acquiring corresponding parameter length information according to the parameters of the historical normal system events of the same keyword;

construct a mapping relationship between each keyword and corresponding parameter length information to obtain a predetermined mapping relationship, as parameter length information of a normal system event.

In one or more embodiments of the present disclosure, the training unit is further configured to perform a training process on the second event recognition model, where the training process is as follows:

acquiring a plurality of historical normal system events of the target container; performing feature extraction on each of the historical normal system events to obtain historical feature information corresponding to each of the historical normal system events; and performing unsupervised learning on historical feature information corresponding to the plurality of the historical normal system events to obtain the second event recognition model.

In one or more embodiments of the present disclosure, if the second event recognition model is an isolation forest model constructed based on historical normal system events, when unsupervised learning is performed on historical feature information corresponding to the plurality of the historical normal system events, the training unit is configured to:

construct a matrix for historical feature information corresponding to each of the historical normal system events, to obtain a feature matrix of each of the historical normal system events.

perform unsupervised learning of isolation forest model according to the feature matrix of the plurality of historical normal system events.

The device provided in this embodiment may be used to execute the technical solutions of the foregoing method embodiments, and implementation principles and technical effects of the device are similar, and are not repeatedly described herein in this embodiment.

Figure 8:
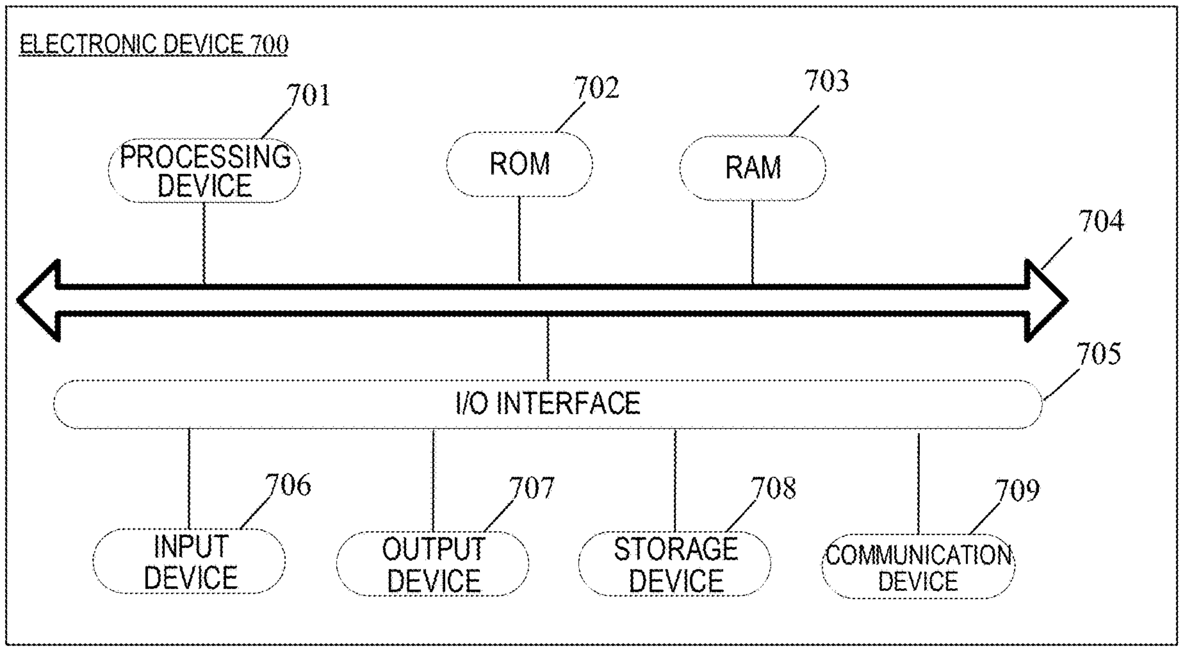
FIG. 8 is a schematic structural diagram of hardware of an electronic device according to an embodiment of the present disclosure.

FIG. 8 illustrates a schematic structural diagram of an electronic device 900 according to an embodiment of the present disclosure. The electronic device 700 may be a terminal device or a server. The terminal device may include, but is not limited to, a mobile terminal such as a mobile phone, a laptop computer, a digital broadcast receiver, a personal digital assistant (Personal Digital Assistant, PDA for short), a tablet computer (Portable Android Device, PAD for short), a portable multimedia player (Portable Media Player, PMP for short), a vehicle-mounted terminal (for example, a vehicle-mounted navigation terminal), and the like, and a fixed terminal such as a digital TV, a desktop computer, and the like. The electronic device shown in FIG. 8 is merely an example and should not bring any limitation to the functions and scope of use of the embodiments of the present disclosure.

As shown in FIG. 8, the electronic device 700 may include a processing device (e. g., central processing unit, graphics processor, etc.) 701 that may perform various suitable actions and processes in accordance with a program stored in a read only memory (ROM) 702 or a program loaded into a random access memory (RAM) 703 from a storage device 708. In the RAM 703, various programs and data necessary for the operation of the electronic apparatus 700 are also stored. The processing devices 701, the ROM 702, and the RAM 703 are connected to each other via a bus 704. An input/output (I/O) interface 705 is also connected to the bus 704.

In general, the following devices may be connected to the I/O interface 705: an input device 706 including, for example, a touch screen, touch pad, keyboard, mouse, camera, microphone, accelerometer, gyroscope, or the like; an output device 707 including, for example, a liquid crystal display (LCD), a speaker, a vibrator, or the like; a storage device 708 including, for example, a magnetic tape, a hard disk, or the like; and a communication device 709. The communication device 709 may allow the electronic device 700 to communicate wirelessly or with other devices to exchange data. While FIG. 8 illustrates the electronic device 700 with a variety of devices, it should be understood that it is not required that all of the illustrated devices be implemented or provided. More or fewer devices may alternatively be implemented or provided.

In particular, the processes described above with reference to the flowcharts can be implemented as computer software programs, in accordance with embodiments of the present disclosure. For example, embodiments of the present disclosure include a computer program product including a computer program carried on a computer readable medium. The computer program includes a program code for executing the method as shown in the flowchart. In such an embodiment, the computer program may be downloaded and installed from the network via communications device 709, installed from storage device 708, or installed from ROM 702. When the computer program is executed by the processing device 701, the above-described functions defined in the method according to the embodiment of the present disclosure are executed.

It should be noted that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may also be any computer readable medium (other than the computer readable storage medium) that can communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The computer readable medium may be included in the electronic device, or may exist separately and not be installed in the electronic device.

The computer readable medium carries one or more programs thereon, and when the one or more programs are executed by the electronic device, the electronic device is enabled to execute the method shown in the foregoing embodiments.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be connected to the user's computer through any kind of network, including local area network (LAN) or wide area network (WAN), or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first acquiring unit may also be described as "a unit for acquiring at least two internet protocol addresses".

The functions described herein above can be performed at least in part by one or more hardware logic components. For example, without limitation, example types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of present disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof.

According to a first aspect, according to one or more embodiments of the present disclosure, a method for detecting intrusion of container environment is provided, including:

for a real-time system event of a target container, performing, by calling an event recognition model corresponding to the target container, event recognition on the real-time system event, where the event recognition model is constructed based on a historical normal system event of the target container and is configured to recognize whether the real-time system event in the target container belongs to a normal system event; and in response to determining that the real-time system event is an abnormal system event, calling a predetermined intrusion detection rule to perform intrusion detection on the real-time system event, and determining whether the real-time system event is an intrusion event.

According to one or more embodiments of the present disclosure, calling the event recognition model corresponding to the target container to perform event recognition on the real-time system event includes:

performing feature extraction on the real-time system event to obtain target feature information; and calling the event recognition model corresponding to the target container to determine whether a parameter length of the real-time system event and the target feature information deviate from a normal system event of the target container, and performing event recognition on the real-time system event based on a determination result.

According to one or more embodiments of the present disclosure, the event recognition model includes a first event recognition model and a second event recognition model; where the first event recognition model is constructed based on a parameter length of a historical normal system event of the target container; the second event recognition model is constructed according to feature information of a historical normal system event of the target container.

According to one or more embodiments of the present disclosure, calling the event recognition model corresponding to the target container to determine whether the parameter length of the real-time system event and the target feature information deviate from the normal system event of the target container, and performing event recognition on the real-time system event based on the determination result includes:

inputting the target feature information and the parameter length of the real-time system event into the first event recognition model, and determining whether the parameter length of the real-time system event does not meet a parameter length of the normal system event; and inputting the target feature information into the second event recognition model, and determining whether the target feature information deviates from feature information of the normal system event.

According to one or more embodiments of the present disclosure, the first event recognition model is configured with a predetermined mapping relationship, the predetermined mapping relationship is a mapping between a keyword corresponding to the normal system event of the target container and corresponding parameter length information, and the keyword corresponding to the normal system event is constructed from the feature information of the normal system event;

calling the event recognition model corresponding to the target container to determine whether the parameter length of the real-time system event and the target feature information deviate from the normal system event of the target container includes:

constructing a target keyword based on the target feature information;

retrieving a predetermined mapping relationship based on the target keyword;

in response to retrieving a keyword that is identical to the target keyword in the predetermined mapping relationship, acquiring parameter length information of a normal system event corresponding to the keyword;

determining whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determining that the target feature information deviates from the normal system event.

According to one or more embodiments of the present disclosure, the second event recognition model is an outlier determination model; correspondingly, inputting the target feature information into the second event recognition model and determining whether the target feature information deviates from the feature information of a normal system event includes:

inputting the target feature information into the second event recognition model, and determining whether the target feature information is an outlier relative to the feature information corresponding to the normal system event; and in response to determining that the target feature information is an outlier, determining that the target feature information deviates from the normal system event.

According to one or more embodiments of the present disclosure, the second event recognition model is an isolation forest model constructed on the basis of a historical normal system event; correspondingly, inputting the target feature information into the second event recognition model, and determining whether the target feature information is an outlier relative to feature information corresponding to the historical normal system event includes:

constructing a matrix based on the target feature information to obtain a target feature matrix; and matching the target feature matrix and the isolation forest model to determine whether the target feature matrix is an outlier.

According to one or more embodiments of the present disclosure, performing the feature extraction on the real-time system event of the target container to obtain the target feature information includes:

acquiring first type of attribute information and second type of attribute information from data of the real-time system event; where the first type of attribute information is attribute information having a fixed amount of information and a fixed pattern, and the second type of attribute information is attribute information having an unfixed amount of information or pattern;

converting the second type of attribute information to obtain derived attribute information; and combining the first type of attribute information and the derived attribute information to obtain the target feature information.

According to one or more embodiments of the present disclosure, the first event recognition model is obtained through the following process:

acquiring a plurality of historical normal system events of the target container.

respectively performing feature extraction on a plurality of the historical normal system events to obtain historical feature information corresponding to each of the historical normal system events.

acquiring, based on historical feature information corresponding to the plurality of historical normal system events and parameters of a plurality of the historical normal system events, parameter length information of the normal system events to obtain the first event recognition model.

According to one or more embodiments of the present disclosure, acquiring, based on historical feature information corresponding to the plurality of historical normal system events and parameters of a plurality of the historical normal system events, parameter length information of the normal system events to obtain the first event recognition model includes:

constructing a corresponding keyword according to historical feature information corresponding to each of the historical normal system events.

grouping a plurality of historical normal system events based on a keyword to acquire parameters of the historical normal system events with the same keyword, and acquiring corresponding parameter length information according to the parameters of the historical normal system events of the same keyword.

constructing a mapping relationship between each keyword and corresponding parameter length information to obtain a predetermined mapping relationship, which serves as parameter length information of a normal system event.

According to one or more embodiments of the present disclosure, the second event recognition model is obtained through the following process:

acquiring a plurality of historical normal system events of the target container;

performing feature extraction on each of the historical normal system events to obtain historical feature information corresponding to each of the historical normal system events; and performing unsupervised learning on historical feature information corresponding to the plurality of the historical normal system events to obtain the second event recognition model.

According to one or more embodiments of the present disclosure, if the second event recognition model is an isolation forest model constructed based on historical normal system events, performing the unsupervised learning on historical feature information corresponding to the plurality of the historical normal system events, including:

constructing a matrix for historical feature information corresponding to each of the historical normal system events, so as to obtain a feature matrix of each of the historical normal system events; and performing unsupervised learning of the isolation forest model according to the feature matrix of the plurality of historical normal system events.

According to a second aspect, according to one or more embodiments of the present disclosure, the device for detecting intrusion of a container environment is provided, which includes:

a recognizing unit configured to call, for a real-time system event of a target container, an event recognition model corresponding to the target container to perform event recognition on the real-time system event, where the event recognition model is constructed based on a historical normal system event of the target container and is configured to recognize whether the real-time system event in the target container belongs to a normal system event.

an intrusion detecting unit configured to in response to determining that the real-time system event is an abnormal system event, call a predetermined intrusion detection rule to perform intrusion detection on the real-time system event, and determine whether the real-time system event is an intrusion event.

According to one or more embodiments of the present disclosure, the device further includes a feature extraction unit configured to perform feature extraction on the real-time system event to obtain target feature information.

The recognizing unit is further configured to call the event recognition model corresponding to the target container to determine whether a parameter length of the real-time system event and the target feature information deviate from a normal system event of the target container, and performing event recognition on the real-time system event based on a determination result.

According to one or more embodiments of the present disclosure, the event recognition model includes a first event recognition model and a second event recognition model; where the first event recognition model is constructed based on a parameter length of a historical normal system event of the target container; the second event recognition model is constructed according to feature information of a historical normal system event of the target container.

According to one or more embodiments of the present disclosure, when calling the event recognition model corresponding to the target container to determine whether the parameter length of the real-time system event and the target feature information deviate from the normal system event of the target container, and performing event recognition on the real-time system event based on the determination result, the recognizing unit is configured to:

input the target feature information and the parameter length of the real-time system event into the first event recognition model, and determine whether the parameter length of the real-time system event does not meet a parameter length of the normal system event; and input the target feature information into the second event recognition model, and determine whether the target feature information deviates from feature information of a normal system event.

According to one or more embodiments of the present disclosure, the first event recognition model is configured with a predetermined mapping relationship, and the predetermined mapping relationship is a mapping between a keyword corresponding to the normal system event of the target container and corresponding parameter length information, and the keyword corresponding to the normal system event is constructed from the feature information of the normal system event.

When inputting the target feature information of the real-time system event and the parameter length are input into the first event recognition model and determining whether the parameter length of the real-time system event does not meet the parameter length of the normal system event, the recognizing unit is configured to:

constructing a target keyword based on the target feature information;

retrieving a predetermined mapping relationship based on the target keyword;

in response to retrieving a keyword that is identical to the target keyword in the predetermined mapping relationship, acquiring parameter length information of a normal system event corresponding to the keyword;

determining whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determining that the target feature information deviates from the normal system event.

According to one or more embodiments of the present disclosure, the second event recognition model is an outlier determination model. Correspondingly, when inputting the target feature information into the second event recognition model and determining whether the target feature information deviates from feature information of a normal system event, the recognizing unit is configured to:

input the target feature information into the second event recognition model, and determining whether the target feature information is an outlier relative to the feature information corresponding to the normal system event; and If it is determined that the target feature information is an outlier, determine that the target feature information is feature information that deviates from a normal system event.

According to one or more embodiments of the present disclosure, the second event recognition model is an isolation forest model constructed on the basis of a historical normal system event. Correspondingly, when inputting the target feature information into the second event recognition model and determining whether the target feature information is an outlier relative to feature information corresponding to the historical normal system event, the recognizing unit 601 is configured to:

construct a matrix based on the target feature information to obtain a target feature matrix; and match the target feature matrix and the isolation forest model to determine whether the target feature matrix is an outlier.

According to one or more embodiments of the present disclosure, when performing feature extraction on the real-time system event of the target container to obtain the target feature information, the feature extraction 603 601 is configured to:

acquire first type of attribute information and second type of attribute information from data of the real-time system event; where the first type of attribute information is attribute information having a fixed amount of information and a fixed pattern, and the second type of attribute information is attribute information having an unfixed amount of information or pattern;

convert the second type of attribute information to obtain derived attribute information; and combine the first type of attribute information and the derived attribute information to obtain the target feature information.

According to one or more embodiments of the present disclosure, the device further includes a training unit, configured to perform a training process on the first event recognition model, where the training process is as follows:

acquiring a plurality of historical normal system events of the target container;

performing feature extraction on a plurality of the historical normal system events respectively to obtain historical feature information corresponding to each of the historical normal system events.

acquiring, based on historical feature information corresponding to the plurality of historical normal system events and parameters of a plurality of the historical normal system events, parameter length information of the normal system event to obtain the first event recognition model.

According to one or more embodiments of the present disclosure, when acquiring, based on the historical feature information corresponding to the plurality of historical normal system events and the parameters of the plurality of historical normal system events, the parameter length information of the normal system event to obtain the first event recognition model, the training unit is configured to:

constructing a corresponding keyword according to historical feature information corresponding to each of the historical normal system events;

grouping a plurality of historical normal system events based on the keyword to acquire parameters of the historical normal system events with the same keyword, and acquiring corresponding parameter length information according to the parameters of the historical normal system events of the same keyword;

constructing a mapping relationship between each keyword and corresponding parameter length information to obtain a predetermined mapping relationship, as parameter length information of a normal system event.

According to one or more embodiments of the present disclosure, the training unit is further configured to perform a training process on the second event recognition model, where the training process is as follows:

acquiring a plurality of historical normal system events of the target container;

performing feature extraction on each of the historical normal system events to obtain historical feature information corresponding to each of the historical normal system events; and performing unsupervised learning on historical feature information corresponding to the plurality of the historical normal system events to obtain the second event recognition model.

According to one or more embodiments of the present disclosure, if the second event recognition model is an isolation forest model constructed based on historical normal system events, when unsupervised learning is performed on historical feature information corresponding to the plurality of the historical normal system events, the training unit is configured to:

constructing a matrix for historical feature information corresponding to each of the historical normal system events, so as to obtain a feature matrix of each of the historical normal system events.

performing unsupervised learning of isolation forest model according to the feature matrix of the plurality of historical normal system events.

According to a third aspect, in one or more embodiments of the present disclosure, an electronic device is provided, including at least one processor and a memory.

The memory stores computer-executable instructions.

The at least one processor executes computer-executable instructions stored in the memory, so that the at least one processor executes the method for detecting intrusion of a container environment according to the first aspect and various possible designs of the first aspect.

According to a fourth aspect, according to one or more embodiments of the present disclosure, a computer readable storage medium is provided. The computer readable storage medium stores computer-executable instructions. When a processor executes the computer-executable instructions, the method for detecting intrusion of a container environment according to the first aspect and various possible designs of the first aspect is implemented.

According to a fifth aspect, a computer program product is provided according to one or more embodiments of the present disclosure. The computer program product includes computer-executable instructions. When a processor executes the computer-executable instructions, the method for detecting intrusion of a container environment according to the first aspect and various possible designs of the first aspect is implemented.

The above description is only embodiments of present disclosure, and an explanation of the technical principles used. Those skilled in the art should understand that the scope of the disclosure involved in present disclosure is not limited to technical solutions composed of specific combinations of the above technical features but should also covers other technical solutions formed by arbitrary combinations of the above technical features or their equivalent features without departing from the above disclosure concept. For example, technical solutions formed by replacing the above features with (but not limited to) technical features with similar functions disclosed in present disclosure.

In addition, although a plurality of operations is depicted in a specific order, this should not be understood as requiring these operations to be performed in the specific order shown or in a sequential order. In certain environments, multitasking and parallel processing may be advantageous. Similarly, although a plurality of implementation details is included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

What is claimed is:

1. A method for detecting intrusion of a container environment, comprising:

for a real-time system event of a target container, performing, by calling an event recognition model corresponding to the target container, event recognition on the real-time system event, wherein the event recognition model is constructed based on a historical normal system event of the target container, and is configured to recognize whether the real-time system event in the target container belongs to a normal system event; and in response to determining that the real-time system event is an abnormal system event, calling a predetermined intrusion detection rule to perform intrusion detection on the real-time system event, and determining whether the real-time system event is an intrusion event;

wherein calling the event recognition model corresponding to the target container to perform the event recognition on the real-time system event comprises:

performing feature extraction on the real-time system event to obtain target feature information; and calling the event recognition model corresponding to the target container to determine whether a parameter length of the real-time system event and the target feature information deviate from the normal system event of the target container; and performing the event recognition on the real-time system event based on a determination result, wherein the event recognition model comprises a first event recognition model and a second event recognition model, and wherein calling the event recognition model corresponding to the target container to determine whether the parameter length of the real-time system event and the target feature information deviate from the normal system event of the target container, and performing the event recognition on the real-time system event based on the determination result comprises:

inputting the target feature information and the parameter length of the real-time system event into the first event recognition model, and determining whether the parameter length of the real-time system event does not meet a parameter length of the normal system event; and inputting the target feature information into the second event recognition model; and determining whether the target feature information deviates from feature information of the normal system event.

2. The method according to claim 1, wherein the first event recognition model is constructed based on a parameter length of the historical normal system event of the target container, and the second event recognition model is constructed based on feature information of the historical normal system event of the target container.

3. The method according to claim 2, wherein the first event recognition model is configured with a predetermined mapping relationship, the predetermined mapping relationship is a mapping between a keyword corresponding to the normal system event of the target container and corresponding parameter length information, and the keyword corresponding to the normal system event is constructed from the feature information of the normal system event, calling the event recognition model corresponding to the target container to determine whether the parameter length of the real-time system event and the target feature information deviate from the normal system event of the target container comprises:

constructing a target keyword based on the target feature information;

retrieving in the predetermined mapping relationship based on the target keyword;

in response to retrieving a keyword that is identical to the target keyword in the predetermined mapping relationship, acquiring parameter length information of a normal system event corresponding to the keyword;

determining whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determining that the target feature information deviates from the normal system event.

4. The method according to claim 1, wherein the second event recognition model is an outlier determination model;

wherein inputting the target feature information into the second event recognition model and determining whether the target feature information deviates from the feature information of the normal system event comprises:

inputting the target feature information into the second event recognition model, and determining whether the target feature information is an outlier relative to the feature information corresponding to the normal system event; and in response to determining that the target feature information is the outlier, determining that the target feature information deviates from the feature information of the normal system event.

5. The method according to claim 4, wherein the second event recognition model is an isolation forest model constructed based on the historical normal system event;

wherein inputting the target feature information into the second event recognition model, and determining whether the target feature information is the outlier relative to the feature information corresponding to the historical normal system event comprises:

constructing a matrix based on the target feature information to obtain a target feature matrix; and matching the target feature matrix and the isolation forest model to determine whether the target feature matrix is an outlier.

6. The method according to claim 1, wherein performing the feature extraction on the real-time system event of the target container to obtain the target feature information comprises:

acquiring first type of attribute information and second type of attribute information from data of the real-time system event; wherein the first type of attribute information is attribute information having a fixed amount of information and a fixed pattern, and the second type of attribute information is attribute information having an unfixed amount of information or pattern;

converting the second type of attribute information to obtain derived attribute information; and combining the first type of attribute information and the derived attribute information to obtain the target feature information.

7. An electronic device, comprising:

at least one processor; and a memory;

the memory storing computer-executable instructions;

the at least one processor executing the computer-executable instructions stored in the memory, to execute acts comprising:

for a real-time system event of a target container, performing, by calling an event recognition model corresponding to the target container, event recognition on the real-time system event, wherein the event recognition model is constructed based on a historical normal system event of the target container, and is configured to recognize whether the real-time system event in the target container belongs to a normal system event; and in response to determining that the real-time system event is an abnormal system event, calling a predetermined intrusion detection rule to perform intrusion detection on the real-time system event, and determining whether the real-time system event is an intrusion event wherein calling the event recognition model corresponding to the target container to perform the event recognition on the real-time system event comprises:

performing feature extraction on the real-time system event to obtain target feature information; and calling the event recognition model corresponding to the target container to determine whether a parameter length of the real-time system event and the target feature information deviate from the normal system event of the target container; and performing the event recognition on the real-time system event based on a determination result, wherein the event recognition model comprises a first event recognition model and a second event recognition model, and wherein calling the event recognition model corresponding to the target container to determine whether the parameter length of the real-time system event and the target feature information deviate from the normal system event of the target container, and performing the event recognition on the real-time system event based on the determination result comprises:

inputting the target feature information and the parameter length of the real-time system event into the first event recognition model, and determining whether the parameter length of the real-time system event does not meet a parameter length of the normal system event; and inputting the target feature information into the second event recognition model; and determining whether the target feature information deviates from feature information of the normal system event.

8. The electronic device according to claim 7, wherein the first event recognition model is constructed based on a parameter length of the historical normal system event of the target container, and the second event recognition model is constructed based on feature information of the historical normal system event of the target container.

9. The electronic device according to claim 8, wherein the first event recognition model is configured with a predetermined mapping relationship, the predetermined mapping relationship is a mapping between a keyword corresponding to the normal system event of the target container and corresponding parameter length information, and the keyword corresponding to the normal system event is constructed from the feature information of the normal system event, calling the event recognition model corresponding to the target container to determine whether the parameter length of the real-time system event and the target feature information deviate from the normal system event of the target container comprises:

constructing a target keyword based on the target feature information;

retrieving in the predetermined mapping relationship based on the target keyword;

in response to retrieving a keyword that is identical to the target keyword in the predetermined mapping relationship, acquiring parameter length information of a normal system event corresponding to the keyword;

determining whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determining that the target feature information deviates from the normal system event.

10. The electronic device according to claim 7, wherein the second event recognition model is an outlier determination model;

wherein inputting the target feature information into the second event recognition model and determining whether the target feature information deviates from the feature information of the normal system event comprises:

inputting the target feature information into the second event recognition model, and determining whether the target feature information is an outlier relative to the feature information corresponding to the normal system event; and in response to determining that the target feature information is the outlier, determining that the target feature information deviates from the feature information of the normal system event.

11. The electronic device according to claim 10, wherein the second event recognition model is an isolation forest model constructed based on the historical normal system event;

wherein inputting the target feature information into the second event recognition model, and determining whether the target feature information is the outlier relative to the feature information corresponding to the historical normal system event comprises:

constructing a matrix based on the target feature information to obtain a target feature matrix; and matching the target feature matrix and the isolation forest model to determine whether the target feature matrix is an outlier.

12. The electronic device according to claim 7, wherein performing the feature extraction on the real-time system event of the target container to obtain the target feature information comprises:

acquiring first type of attribute information and second type of attribute information from data of the real-time system event; wherein the first type of attribute information is attribute information having a fixed amount of information and a fixed pattern, and the second type of attribute information is attribute information having an unfixed amount of information or pattern;

converting the second type of attribute information to obtain derived attribute information; and combining the first type of attribute information and the derived attribute information to obtain the target feature information.

13. A non-transitory computer readable storage medium having computer-executable instructions stored thereon, when executing the computer-executable instructions, a processor implements acts comprising:

for a real-time system event of a target container, performing, by calling an event recognition model corresponding to the target container, event recognition on the real-time system event, wherein the event recognition model is constructed based on a historical normal system event of the target container, and is configured to recognize whether the real-time system event in the target container belongs to a normal system event; and in response to determining that the real-time system event is an abnormal system event, calling a predetermined intrusion detection rule to perform intrusion detection on the real-time system event, and determining whether the real-time system event is an intrusion event;

wherein calling the event recognition model corresponding to the target container to perform the event recognition on the real-time system event comprises:

performing feature extraction on the real-time system event to obtain target feature information; and calling the event recognition model corresponding to the target container to determine whether a parameter length of the real-time system event and the target feature information deviate from the normal system event of the target container, and performing the event recognition on the real-time system event based on a determination result, wherein the event recognition model comprises a first event recognition model and a second event recognition model, and wherein calling the event recognition model corresponding to the target container to determine whether the parameter length of the real-time system event and the target feature information deviate from the normal system event of the target container, and performing the event recognition on the real-time system event based on the determination result comprises:

inputting the target feature information and the parameter length of the real-time system event into the first event recognition model, and determining whether the parameter length of the real-time system event does not meet a parameter length of the normal system event; and inputting the target feature information into the second event recognition model; and determining whether the target feature information deviates from feature information of the normal system event.

14. The non-transitory computer readable storage medium according to claim 13, wherein the first event recognition model is constructed based on a parameter length of the historical normal system event of the target container, and the second event recognition model is constructed based on feature information of the historical normal system event of the target container.

15. The non-transitory computer readable storage medium according to claim 14, wherein the first event recognition model is configured with a predetermined mapping relationship, the predetermined mapping relationship is a mapping between a keyword corresponding to the normal system event of the target container and corresponding parameter length information, and the keyword corresponding to the normal system event is constructed from the feature information of the normal system event, calling the event recognition model corresponding to the target container to determine whether the parameter length of the real-time system event and the target feature information deviate from the normal system event of the target container comprises:

constructing a target keyword based on the target feature information;

retrieving in the predetermined mapping relationship based on the target keyword;

in response to retrieving a keyword that is identical to the target keyword in the predetermined mapping relationship, acquiring parameter length information of a normal system event corresponding to the keyword;

determining whether the parameter length of the real-time system event does not meet the parameter length of the normal system event based on the parameter length of the real-time system event and the parameter length information of the normal system event; and in response to not retrieving the keyword that is identical to the target keyword in the predetermined mapping relationship, determining that the target feature information deviates from the normal system event.

16. The non-transitory computer readable storage medium according to claim 13, wherein the second event recognition model is an outlier determination model, wherein inputting the target feature information into the second event recognition model and determining whether the target feature information deviates from the feature information of the normal system event comprises:

inputting the target feature information into the second event recognition model, and determining whether the target feature information is an outlier relative to the feature information corresponding to the normal system event; and in response to determining that the target feature information is the outlier, determining that the target feature information deviates from the feature information of the normal system event.

17. The non-transitory computer readable storage medium according to claim 16, wherein the second event recognition model is an isolation forest model constructed based on the historical normal system event, wherein inputting the target feature information into the second event recognition model, and determining whether the target feature information is the outlier relative to the feature information corresponding to the historical normal system event comprises:

constructing a matrix based on the target feature information to obtain a target feature matrix; and matching the target feature matrix and the isolation forest model to determine whether the target feature matrix is the outlier.

* * * * *